(12) United States Patent
Kaku et al.

(10) Patent No.: US 12,158,925 B2
(45) Date of Patent: Dec. 3, 2024

(54) LEARNING-BASED ONLINE MAPPING

(71) Applicant: TOYOTA RESEARCH INSTITUTE, INC., Los Altos, CA (US)

(72) Inventors: Shunsho Kaku, Mountain View, CA (US); Jeffrey Michael Walls, Mountain View, CA (US); Ryan Wolcott, Ann Arbor, MI (US)

(73) Assignee: TOYOTA RESEARCH INSTITUTE, INC.

( * ) Notice: Subject to any disclaimer, the term of this patent is extended or adjusted under 35 U.S.C. 154(b) by 742 days.

(21) Appl. No.: 17/118,097

(22) Filed: Dec. 10, 2020

(65) Prior Publication Data
US 2022/0188581 A1 Jun. 16, 2022

(51) Int. Cl.
G06F 18/2415 (2023.01)
G01C 21/00 (2006.01)
G06N 5/04 (2023.01)
G06N 20/00 (2019.01)
G06V 20/56 (2022.01)

(52) U.S. Cl.
CPC ..... G06F 18/2415 (2023.01); G01C 21/3815 (2020.08); G01C 21/3841 (2020.08); G06N 5/04 (2013.01); G06N 20/00 (2019.01); G06V 20/588 (2022.01)

(58) Field of Classification Search
CPC ............ G06F 18/2415; G01C 21/3815; G01C 21/3841; G06N 5/04; G06N 20/00; G06N 7/01; G06N 3/006; G06N 3/02; G06V 20/588

See application file for complete search history.

(56) References Cited

U.S. PATENT DOCUMENTS

| | | | |
|---|---|---|---|
| 8,948,501 | B1 | 2/2015 | Kim et al. |
| 9,329,598 | B2 | 5/2016 | Pack et al. |
| 9,612,123 | B1 | 4/2017 | Levinson et al. |
| 9,870,624 | B1 | 1/2018 | Narang et al. |
| 10,274,325 | B2 | 4/2019 | Rombouts et al. |
| 10,710,599 | B2 | 7/2020 | Nobre et al. |
| 2017/0248963 | A1* | 8/2017 | Levinson ............. G05D 1/0274 |
| 2019/0145784 | A1* | 5/2019 | Ma ......................... G06F 16/29 |
| | | | 701/448 |
| 2019/0219401 | A1 | 7/2019 | Daniilidis et al. |
| 2019/0286921 | A1* | 9/2019 | Liang .................... G06F 16/909 |
| 2020/0249684 | A1* | 8/2020 | Onofrio ............... G05D 1/0219 |
| 2020/0293797 | A1* | 9/2020 | Liu ........................ G08G 1/167 |
| 2020/0309536 | A1* | 10/2020 | Omari .................... G07C 5/008 |

(Continued)

OTHER PUBLICATIONS

Shipitko, et al., "Linear Features Observation Model for Autonomous Vehicle Localization", arxiv:2002.12731v1, https://arxiv.org/abs/2002.12731, Feb. 28, 2020.

(Continued)

*Primary Examiner* — Ping Y Hsieh
*Assistant Examiner* — Vaisali Rao Koppolu
(74) *Attorney, Agent, or Firm* — SEYFARTH SHAW LLP

(57) ABSTRACT

A method for an online mapping system includes localizing a location of an ego vehicle relative to an offline feature map. The method also includes querying surrounding features of the ego vehicle based on the offline feature map. The method further includes generating a probabilistic map regarding the surrounding features of the ego vehicle queried from the offline feature map.

19 Claims, 11 Drawing Sheets

(56) References Cited

U.S. PATENT DOCUMENTS

| | | | |
|---|---|---|---|
| 2020/0309541 A1* | 10/2020 | Lavy | G06V 20/588 |
| 2021/0004611 A1* | 1/2021 | Garimella | G05B 13/0265 |
| 2021/0094574 A1* | 4/2021 | Lee | B60W 60/0015 |
| 2021/0166325 A1* | 6/2021 | Shalev-Shwartz | B62D 15/0265 |
| 2021/0192748 A1* | 6/2021 | Morales Morales | G05D 1/0088 |
| 2021/0405638 A1* | 12/2021 | Boyraz | G06V 20/64 |
| 2024/0054407 A1* | 2/2024 | Casas | G06N 7/01 |

OTHER PUBLICATIONS

Alcantarilla, et al., "Street-view Change Detection with Deconvolutional Networks," Auton Robot 42, 1301-1322 (2018).

Paz, et al., "Probabilistic Semantic Mapping for Urban Autonomous Driving Applications", arxiv:2006.04894v1, https://arxiv.org/abs/2006.04894v1, Jun. 8, 2020.

* cited by examiner

LEARNING-BASED ONLINE MAPPING

BACKGROUND

Field

Certain aspects of the present disclosure generally relate to machine learning and, more particularly, learning-based online mapping.

Background

Autonomous agents (e.g., vehicles, robots, etc.) rely on machine vision for sensing a surrounding environment and analyzing areas of interest in images of the surrounding environment. Although scientists have spent decades studying the human visual system, a solution for realizing equivalent machine vision remains elusive. Realizing equivalent machine vision is a goal for enabling autonomous agents. Machine vision is distinct from the field of digital image processing. Instead, machine vision recovers a three-dimensional (3D) structure of the world from images and uses the 3D structure for fully understanding a scene based on a two-dimensional camera input. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a camera (e.g., video/image) input based on annotations of automobiles within the scene. For example, autonomous operation, as well as advanced driver assistance systems (ADAS), may rely on an annotated high definition map to provide surrounding vehicle information. Unfortunately, an annotated, high definition (HD) map is both difficult to create and expensive to maintain in an up-to-date HD map.

SUMMARY

A method for an online mapping system includes localizing a location of an ego vehicle relative to an offline feature map. The method also includes querying surrounding features of the ego vehicle based on the offline feature map. The method further includes generating a probabilistic map regarding the surrounding features of the ego vehicle queried from the offline feature map.

A non-transitory computer-readable medium having program code recorded thereon for an online mapping system is described. The program code is executed by a processor. The non-transitory computer-readable medium includes program code to localize a location of an ego vehicle relative to an offline feature map. The non-transitory computer-readable medium also includes program code to query surrounding features of the ego vehicle based on the offline feature map. The non-transitory computer-readable medium further includes program code to generate a probabilistic map regarding the surrounding features of the ego vehicle queried from the offline feature map.

A system for online mapping is described. The system includes a localization module configured to localize a location of an ego vehicle relative to an offline feature map. The system also includes a learned online mapping model train to query surrounding features of the ego vehicle based on the offline feature map. The system further includes a probabilistic map module configured to generate a probabilistic map regarding the surrounding features of the ego vehicle queried from the offline feature map.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
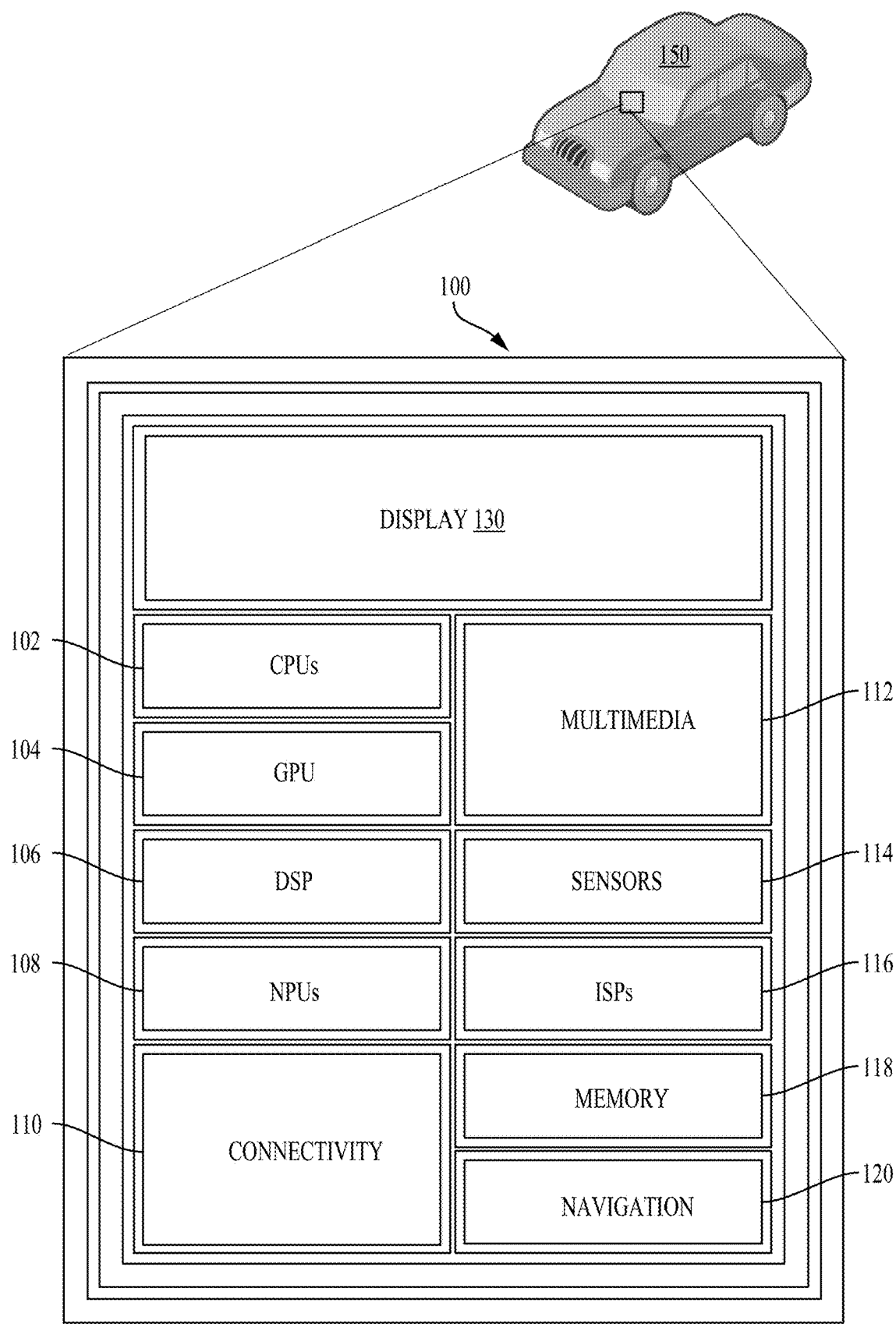
FIG. 1 illustrates an example implementation of designing a system using a system-on-a-chip (SOC) for learning-based online mapping, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a camera (e.g., video/image) input based on annotations of automobiles and surroundings within the scene. For example, autonomous operation, as well as advanced driver assistance systems (ADAS), may rely on an annotated high definition map to provide surrounding vehicle information. Unfortunately, an annotated, high definition (HD) map is both difficult to create and expensive to maintain.

Deep learning often involves large labeled datasets to reach state-of-the-art performance. Unfortunately, large labeled datasets may be unavailable to reach state-of-the-art performance. Online mapping may enable state-of-the-art performance for autonomous driving and advanced driver assistance systems (ADAS). During autonomous operation, an online map can provide information on the surroundings of an ego vehicle without having to rely on a high-definition (HD) map. In practice, an annotated, HD map is both difficult to create and expensive to maintain. A learning-based online mapping system is desired for autonomous vehicles and ADAS systems to enable prediction and planning of, for example, a trajectory of an ego vehicle.

Conventional methods for online mapping include: (1) feature-based methods and (2) learning-based methods. Feature-based methods for online mapping are straightforward. Unfortunately, feature-based methods suffer from a significant drawback. In feature-based methods, registered map information may be overly sparse, especially when traffic is crowded or the weather and lighting conditions are poor. By contrast, learning-based methods may provide map information that is quite rich and based on a learned end-to-end network. The drawback of a learning-based system is a lack of highly reliable or concrete information. This lack of highly reliable or concrete information is caused by using information directly from images, which is too sparse, resulting in significant uncertainties of an output map. Another disadvantage of learning-based methods is an inability to handle the ambiguity of similar roads or intersections. In particular, conventional online mapping methods suffer from a limited field of view to enable prediction and planning of an ego vehicle.

Aspects of the present disclosure are directed to a learning-based online mapping system. In one aspect of the present disclosure, a learned deep neural network (DNN) detector is trained to output a probabilistic map of the surroundings of an ego vehicle. In one configuration, a learned probabilistic map is the output of the learning-based online mapping system. The probabilistic map may include various objects of interest, including, but not limited to, driving lanes, lane lines, intersections, stop lines, crosswalks, and the like. For example, each element in the probabilistic map is represented in a hybrid way. In this example, the probabilistic map represents elements using a combination of metric vectors with spatial uncertainty and detection confidence, and a probabilistic grid map.

Taking a lane as an example, a driving lane includes: (1) polyline (e.g., a vector of waypoints) of a left-lane line (the left-lane could be an empty vector if the conference is lower than a given threshold); (2) spatial uncertainty of the polyline; (3) a left-lane confidence of the left-lane line estimation. The driving lane also includes: (4) polyline (e.g., a vector of waypoints) of a right-lane line (the right lane may be an empty vector if the conference is lower than a given threshold); (5) a spatial uncertainty of the polyline; (6) a right-lane confidence of right-lane line estimation; and (7) a probabilistic grip map of the lane. This learning-based online mapping method may rely on a feature map.

In one aspect of the present disclosure, the learning-based online mapping method relies on an offline feature map that is periodically updated to perform learning-based online mapping. In one configuration, images captured through front-facing and/or side-facing cameras during normal operation of a fleet of vehicles are stored. This method includes detecting features from the stored images captured by the fleet of vehicles. Based on the detected features, an offline feature map is updated to form a new, periodically updated offline feature map. For example, the offline feature map may be updated daily (e.g., after each 24-hour period).

FIG. 1 illustrates an example implementation of the aforementioned system and method for learning-based online mapping using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130, illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for learning-based online mapping from an image captured by the sensor processor 114. The instructions loaded into a processor (e.g., CPU 102) may also include code for planning and control (e.g., of the ego vehicle 150) in response to the learning-based online mapping from the images captured by the sensor processor 114.

Figure 2:
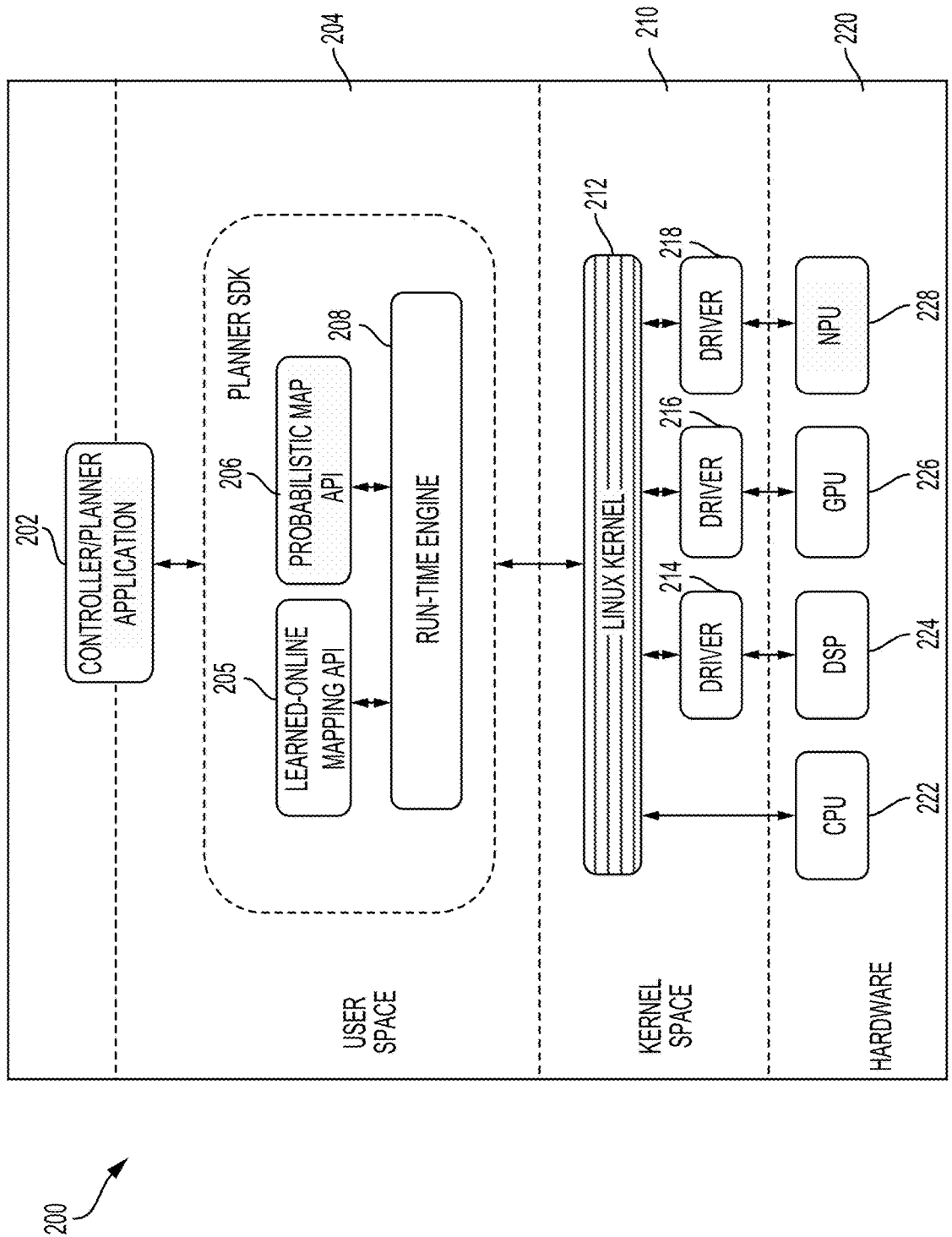
FIG. 2 is a block diagram illustrating a software architecture that may modularize functions for learning-based online mapping, according to aspects of the present disclosure.

FIG. 2 is a block diagram illustrating a software architecture 200 that may modularize functions for planning and control of an ego vehicle using learning-based online mapping, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, analyze a scene in a video captured by a monocular camera of an ego vehicle learning-based online map of objects in the scene. In aspects of the present disclosure, learning-based online mapping is performed to provide a probabilistic map based on a periodically updated feature map. The controller/planner application 202 may make a request to compile program code associated with a library defined in a learning-based online mapping application programming interface (API) 205 to generate a probabilistic map of surrounding objects of interest of an ego vehicle within a scene of a video captured by the monocular camera of the ego vehicle. The learning-based online mapping is trained to generate a probabilistic map using a probabilistic map API 206. For example, an ego vehicle is equipped with an online mapping model to generate a surrounding feature based prediction model directly onboard as the vehicle is driven. The online mapping model may reply on a periodically updated feature map by a fleet of vehicles. The more frequently the ego vehicle is driven, the better the model becomes at identifying features of interest of the ego vehicle.

A run-time engine 208, which may be compiled code of a run-time framework, may be further accessible to the controller/planner application 202. The controller/planner application 202 may cause the run-time engine 208, for example, to perform learning-based online mapping of features of interest for an ego vehicle. When an object is detected within a predetermined distance of the ego vehicle, the run-time engine 208 may in turn send a signal to an operating system 210, such as a Linux Kernel 212, running on the system-on-a-chip (SOC) 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
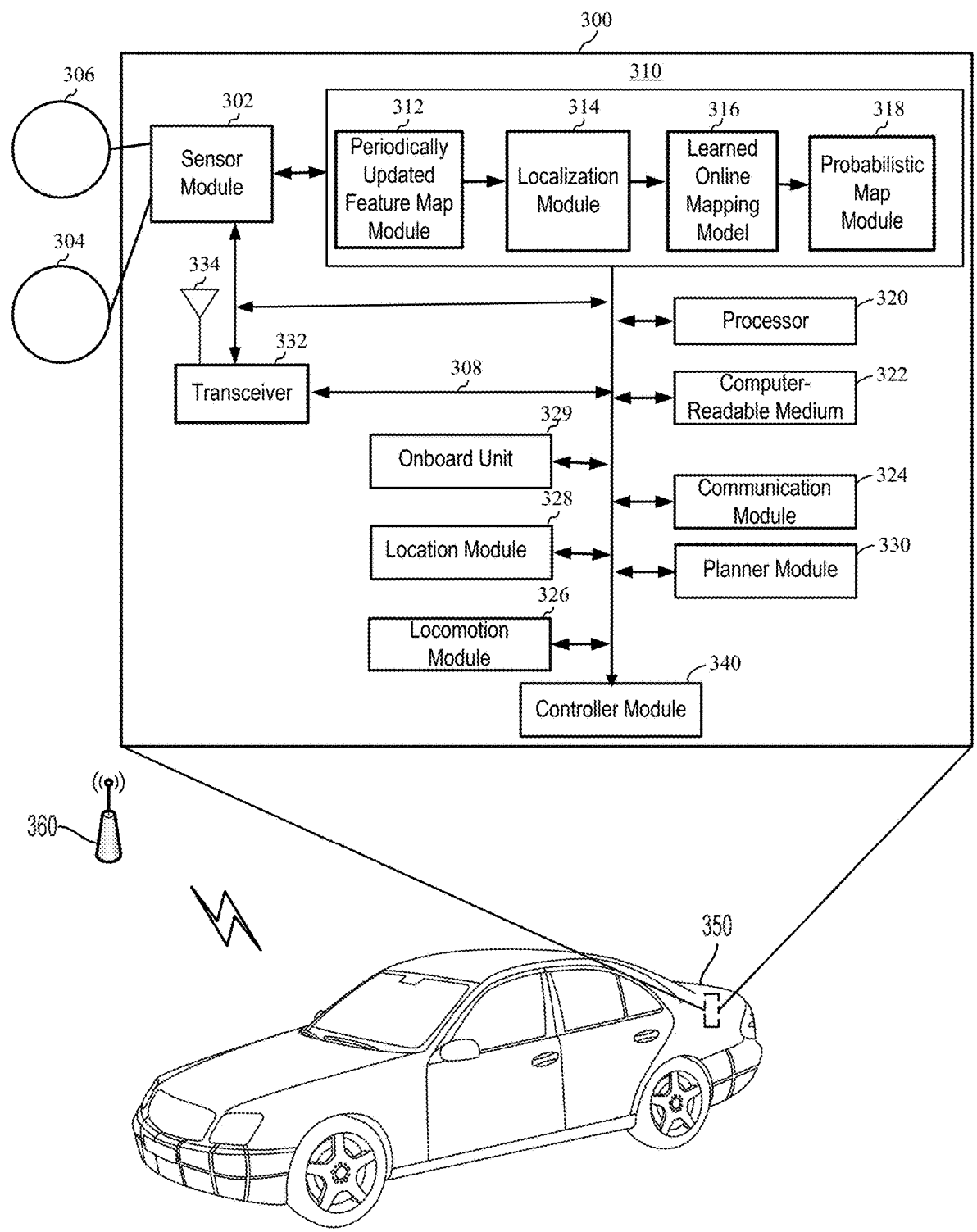
FIG. 3 is a diagram illustrating an example of a hardware implementation for a learning-based online mapping system, according to aspects of the present disclosure.

FIG. 3 is a diagram illustrating an example of a hardware implementation for a learning-based online mapping system, according to aspects of the present disclosure. A learning-based online mapping system 300 may be configured for generating a probabilistic map to improve understanding objects of interest in a scene. The probabilistic map enables improved planning and controlling of an ego vehicle in response to images from video captured through a camera during operation of a car 350. The learning-based online mapping system 300 may rely on a periodically trained feature map, which is updated by a fleet of vehicles. For example, an ego vehicle may be equipped with a learning-based online mapping model to learn a probabilistic feature map model directly onboard as the ego vehicle is driven. The more frequently the car 350 is driven, the smarter a learning-based online mapping model becomes.

The learning-based online mapping system 300 may be a component of a vehicle, a robotic device, or other device. For example, as shown in FIG. 3, the learning-based online mapping system 300 is a component of the car 350. Aspects of the present disclosure are not limited to the learning-based online mapping system 300 being a component of the car 350, as other devices, such as a bus, motorcycle, or other like vehicle, are also contemplated for using the learning-based online mapping system 300. The car 350 may be autonomous or semi-autonomous.

The learning-based online mapping system 300 may be implemented with an interconnected architecture, represented generally by an interconnect 308. The interconnect 308 may include any number of point-to-point interconnects, buses, and/or bridges depending on the specific application of the learning-based online mapping system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The learning-based online mapping system 300 includes a transceiver 332 coupled to the sensor module 302, the vehicle perception module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit a probabilistic map of objects within a video and/or planned actions from the vehicle perception module 310 to a server (not shown).

The learning-based online mapping system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the learning-based online mapping system 300 to perform the various functions described for ego vehicle perception of objects of interest for an ego vehicle within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, feature information determined from images captured by the first sensor 304 and/or the second sensor 306 may be transmitted via the transceiver 332. The first sensor 304 and the second sensor 306 may be coupled to the car 350 or may be in communication with the car 350.

Understanding a scene from a video input based on a probabilistic map of objects of interest for an ego vehicle within a scene is an important perception task in the area of autonomous driving, such as the car 350. Aspects of the present disclosure are directed to an improved method of learning-based online mapping. In one aspect of the present disclosure, a learned deep neural network (DNN) detector is trained to output a probabilistic map of the surroundings of an ego vehicle. In one configuration, a learned probabilistic map is the output of the learning-based online mapping system 300.

One aspect of a proposed learning-based online mapping system is the learning-based online mapping system 300, using a probabilistic map including various objects of interest. The various objects of interest include, but are not limited to, driving lanes, lane lines, intersections, stop lines, crosswalks, and the like. For example, each element in the probabilistic map is represented in a hybrid way. In this example, the probabilistic map represents elements using a combination of metric vectors with spatial uncertainty and detection confidence, and a probabilistic grid map. The probabilistic map is used for an advanced driver assistance system of an ego vehicle, such as the car 350, which may be a connected vehicle.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve V2I (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, fifth generation (5G) new radio (NR), long term evolution (LTE), third generation (3G), etc. The communication module 324 may also communicate with other components of the car 350 that are not modules of the learning-based online mapping system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VoLTE), or any other mobile data network or combination of mobile data networks. Further, the network access point 360 may include one or more Institute of Electrical and Electronics Engineers (IEEE) 802.11 wireless networks.

The learning-based online mapping system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and highly autonomous vehicle.

The vehicle perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306. In this aspect of the present disclosure, the vehicle perception module performs learning-based online mapping of features detected from images captured by the first sensor 304 or the second sensor 306 of the car 350.

As shown in FIG. 3, the vehicle perception module 310 includes a periodically updated feature map module 312, a localization module 314, a learned online mapping model 316, and a probabilistic map module 318 (e.g., based on the periodically updated feature map module 312). The periodically updated feature map module 312, the localization module 314, the learned online mapping model 316, and the probabilistic map module 318 may be components of a same or different artificial neural network, such as a deep neural network (DNN). The learned online mapping model 316 and/or the probabilistic map module 318 is not limited to a DNN. In operation, the vehicle perception module 310 receives a data stream from the first sensor 304 and/or the second sensor 306. The data stream may include a two-dimensional red-green-blue (2D RGB) image from the first sensor 304 and light detection and ranging (LIDAR) data points from the second sensor 306. The data stream may include multiple frames, such as image frames. In this configuration, the first sensor 304 captures monocular (single camera) 2D RGB images.

The vehicle perception module 310 is configured to understand a scene from a video input (e.g., the sensor module) based on a probabilistic map describing objects of interest. For example, the objects of interest include, but are not limited to driving lanes, lane lines, intersections, stop lines, crosswalks, and the like, within the scene to perform a perception task during autonomous driving of the car 350. Aspects of the present disclosure are directed to learning-based online mapping (e.g., the learned online mapping model 316) in the car 350. The periodically updated feature map module 312 makes it possible to localize the car 350 using the localization module 314. The periodically updated feature map module 312 makes it possible to train the learned online mapping model 316 to generate a probabilistic map using the probabilistic map module 318. In some aspects, a fleet of vehicles updates the periodically updated feature map module 312 to enable learning-based online mapping using the learned online mapping model 316, for example, as shown in FIG. 5.

Figure 4:
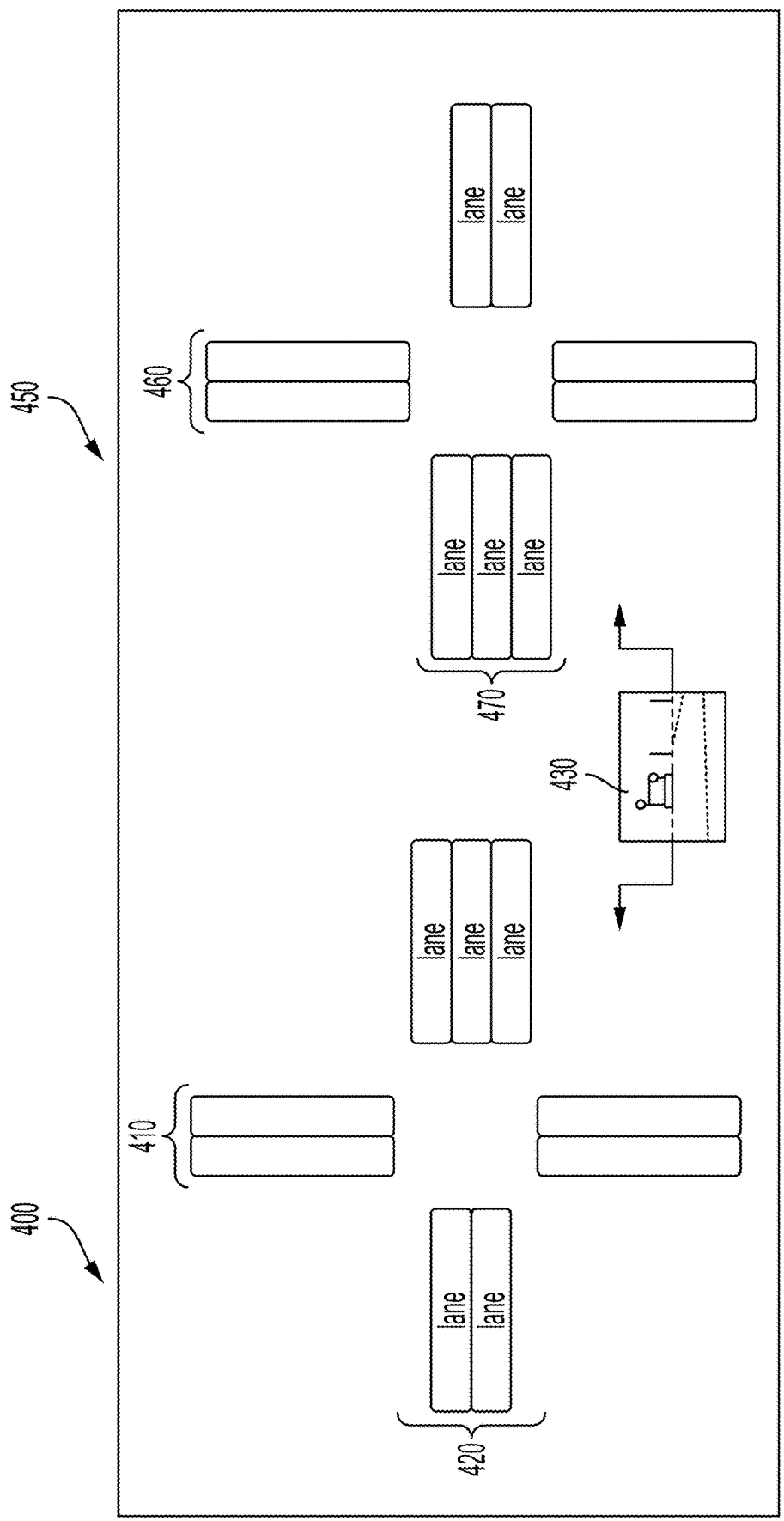
FIGS. 4A and 4B are overhead views illustrating lane diagrams generated using conventional mapping methods.

As noted, online mapping is a desired feature for enabling autonomous driving and advanced driver assistance systems (ADAS). FIGS. 4A and 4B are lane diagrams generated using one of the following methods for online mapping: (1) a feature-based method and (2) a learning-based method. Although straightforward, feature-based methods suffer from a significant drawback. In feature-based methods, registered map information may be really sparse, especially when traffic is crowded or the weather and lighting conditions are not good. By contrast, learning-based methods may provide map information that is quite rich and based on a learned end-to-end network. The drawback of a learning-based system is a lack of highly reliable or concrete information. This lack of highly reliable or concrete information is caused by using information directly from images, which is too sparse, resulting in significant uncertainties of an output map. Another disadvantage of learning-based methods is an inability in handling the ambiguity of similar roads or intersections. In particular, conventional online mapping methods suffer from a limited field of view to enable prediction and planning of an ego vehicle.

For example, as shown in FIG. 4A, the lane diagram 400 is generated using a feature based method according to an image 430. The lane diagram 400 includes a first two-lane roadway 410 and a second multilane roadway 420. As shown in FIG. 4B, a lane diagram 450 is generated using a learning-based method from the same image 430. The lane diagram 450 also includes a first two-lane roadway 460 and a second multilane roadway 470. Due to the limited information of images acquired from the viewpoint of an ego vehicle, the observation of the two-lane diagrams in FIGS. 4A and 4B are quite similar. Unfortunately, an ego vehicle, using its forward-facing camera, is unable to determine whether the second multilane roadway 420 includes two-lanes or three lanes based on the image 430. According to FIGS. 4A and 4B, output from the different methods are quite the same, however, the outputs show the same actual roadway having different numbers of lanes. This scenario is especially acute in dense traffic.

Figure 5:
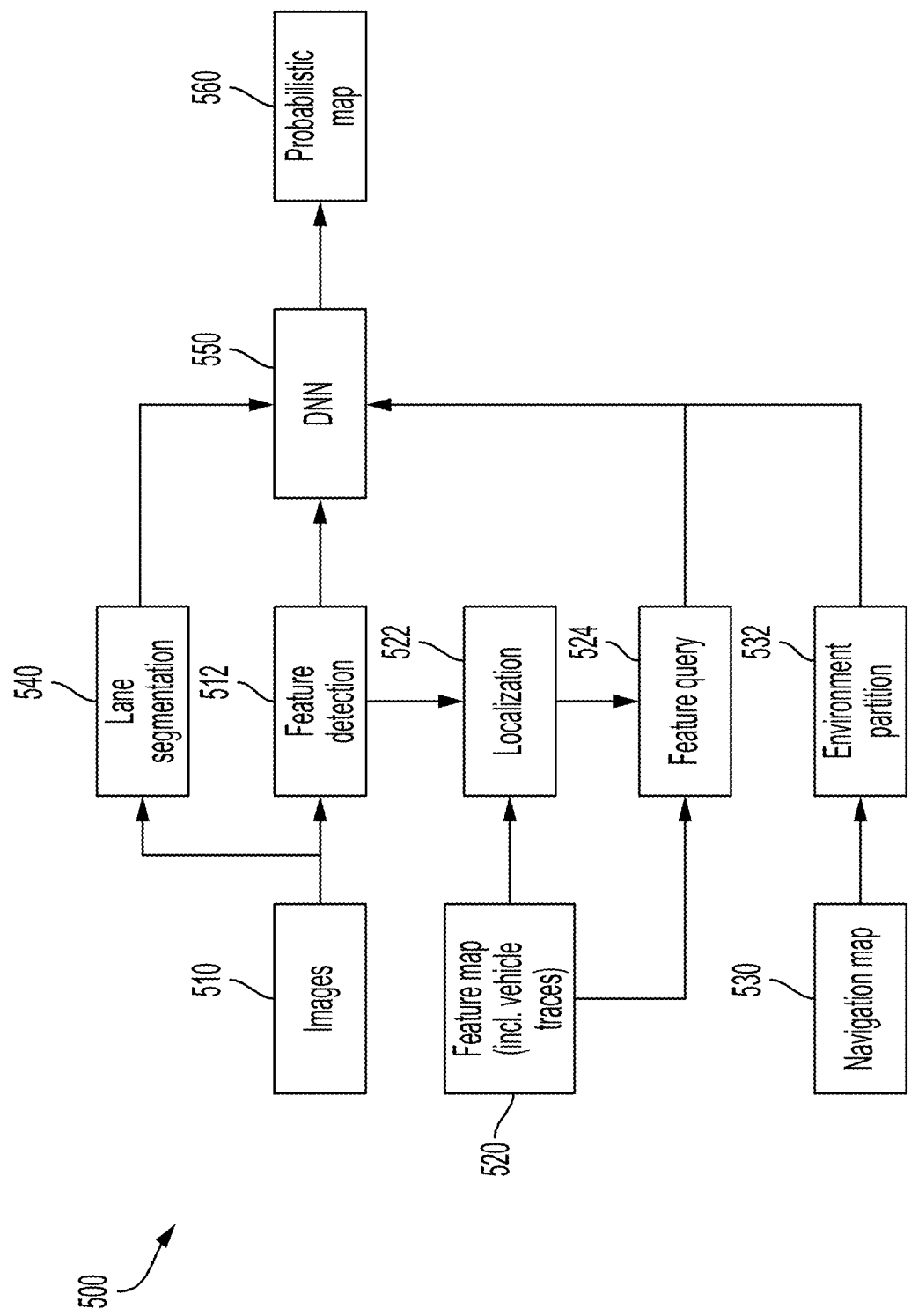
FIG. 5 is a block diagram of a learning-based online mapping system, according to aspects of the present disclosure.

FIG. 5 is a block diagram of a learning-based online mapping system 500 for the learning-based online mapping system 300 of FIG. 3, in accordance with an illustrative configuration of the present disclosure. As shown in FIG. 5, the learning-based online mapping system 500 includes images 510 captured by front-facing cameras of an ego vehicle. In the example of FIG. 5, the learning-based online mapping system 500 relies on an offline feature map 520. In this example, the images 510 from the ego vehicle are provided to a feature detector 512 of the learning-based online mapping system 500, as well as a lane segmentation block 540. The images 510 may include images captured from front-facing and side-facing cameras for providing a full view of the surroundings ahead of the ego vehicle.

In some aspects of the present disclosure, the learning-based online mapping system 500 operates according to a learning-based online mapping process. For example, a localization block 522 is configured to determine a location of the ego vehicle relative to the offline feature map 520. The surrounding features may be detected from the images 510 by the feature detector 512. For example, the localization block 522 determines a location of the ego vehicle by localizing detected features from the feature detector 512 relative to the offline feature map 520.

In this example, once localization of the ego vehicle is complete, a feature query block 524 is configured to query surrounding features of the ego vehicle based on the offline feature map 520. That is, based on the localization, the features of the surroundings are queried from the offline feature map 520 using the feature query block 524. This provides rich, discriminative and deterministic information of the surroundings, which are generally unavailable from the images 510 due to a limited field of views of onboard sensors. That is, the offline feature map 520 is updated using images captured from front-facing and side-facing cameras for providing a full view of the surroundings ahead of an ego vehicle.

Figure 7:
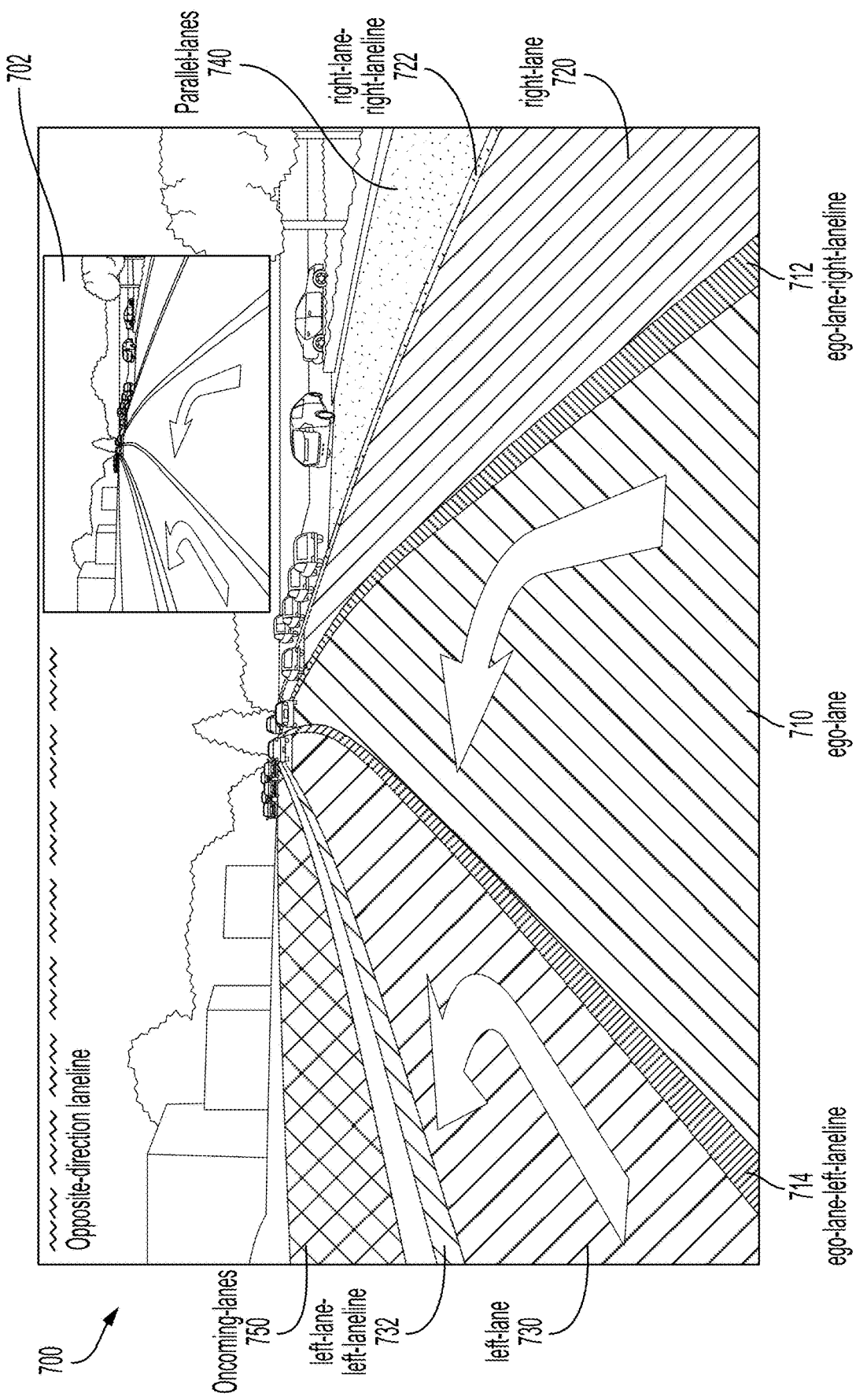
FIG. 7 is a diagram illustrating a perspective view of a lane segmentation map, according to aspects of the present disclosure.

In this example, a lane segmentation block 540 is configured to perform lane segmentation from the images 510, as further illustrated in FIG. 7. According to aspects of the present disclosure, a navigation map 530 is used for various purposes. In some aspects, the navigation map 530 is used to partition the world for processing information locally while maintaining a global representation. For example, a navigation map enables reasoning of the relationship/connectivity between different parts of roadways. For example, an environment partition block 532 is configured to partition roads in the global world into various local segments using the navigation map 530. The navigation map 530 may be any navigation map used in car navigators. The navigation map 530 provides a road network, including nodes representing intersections or road ends, and links with waypoints. The navigation map 530 represents roadways (and the road shape described by the waypoints) between intersections and/or road ends. The navigation map, however, does not provide lane level information (e.g., how many lanes are there or the lane locations).

According to this aspect of the present disclosure, a deep neural network (DNN) detector 550 is configured to generate a probabilistic map 560 regarding the surrounding features of the ego vehicle queried from the offline feature map 520. In this aspect of the present disclosure, features detected from onboard sensors by the feature detector 512 and the offline feature map 520 are registered in a local frame, which covers all the areas around the ego vehicle. For example, the areas around the ego vehicle may include the roadways in which an ego vehicle is driving, oncoming intersections, the roadways beyond the intersections, etc. Using the road segments from the environment partition block 532, these features are projected to each road segment. In this example, the DNN detector 550 performs detection on the road segment and then outputs the probabilistic map 560 of the road segment, in which each local road segment also maintains its global representation.

In some aspects, the offline feature map 520 is optimized automatically based on the features extracted from camera data of daily driving of normal vehicles. For example, the offline feature map 520 is periodically updated (e.g., every 24 hours) in the cloud or in a garage when the ego vehicle is parked. In some aspects of the present disclosure, the offline feature map 520 is periodically updated for performing learning-based online mapping, for example, as shown in FIG. 6.

Figure 6:
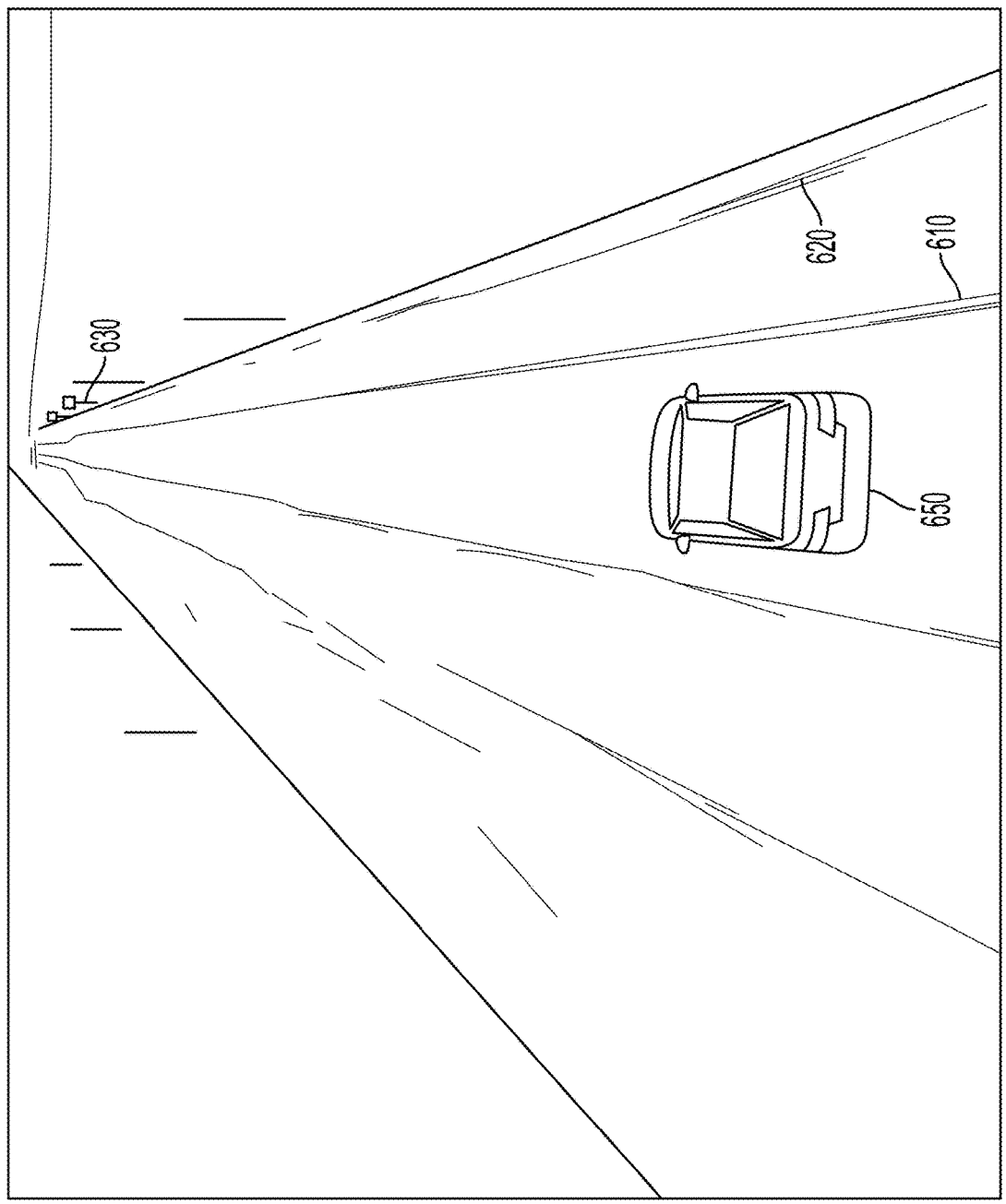
FIG. 6 is a diagram illustrating a perspective view of an offline feature map, according to aspects of the present disclosure.

FIG. 6 is a diagram illustrating a perspective view of an offline feature map 600, according to aspects of the present disclosure. In this example, the offline feature map 600 includes features such as lane markings 610, curbs 620, traffic signs 630, and other like features of interest to an ego vehicle 650 within this location. In one configuration, the offline feature map 600 is updated using an offline feature map update process. According to the feature map update process, images captured through front-facing and/or side-facing cameras during normal operation of a fleet of vehicles are stored. This process includes detecting features from the stored images captured by the fleet of vehicles. Based on the detected features, a current version of the offline feature map 600 is updated to form a new, periodically updated feature map. In addition, the offline feature map 520 of FIG. 5 may be optimized by incorporating vehicle traces from data captured by the fleet of vehicles.

FIG. 7 is a diagram illustrating a perspective view of a lane segmentation map 700 according to aspects of the present disclosure. For example, the lane segmentation map 700 is generated from an image 702 captured by a front-facing camera of an ego vehicle. In this example, the lane segmentation map 700 shows an ego-lane 710 having an ego-lane right lane line 712 and an ego-lane left lane line 714. The lane segmentation map 700 also shows a right-lane 720 having a right-lane line 722. The lane segmentation map 700 further shows a left-lane 730 having a left-lane line 732. The lane segmentation map 700 also shows parallel-lanes 740 and oncoming-lanes 750. In one configuration, the lane segmentation map 700 is generated using a trained deep neural network (DNN)-based classifier.

Figure 8:
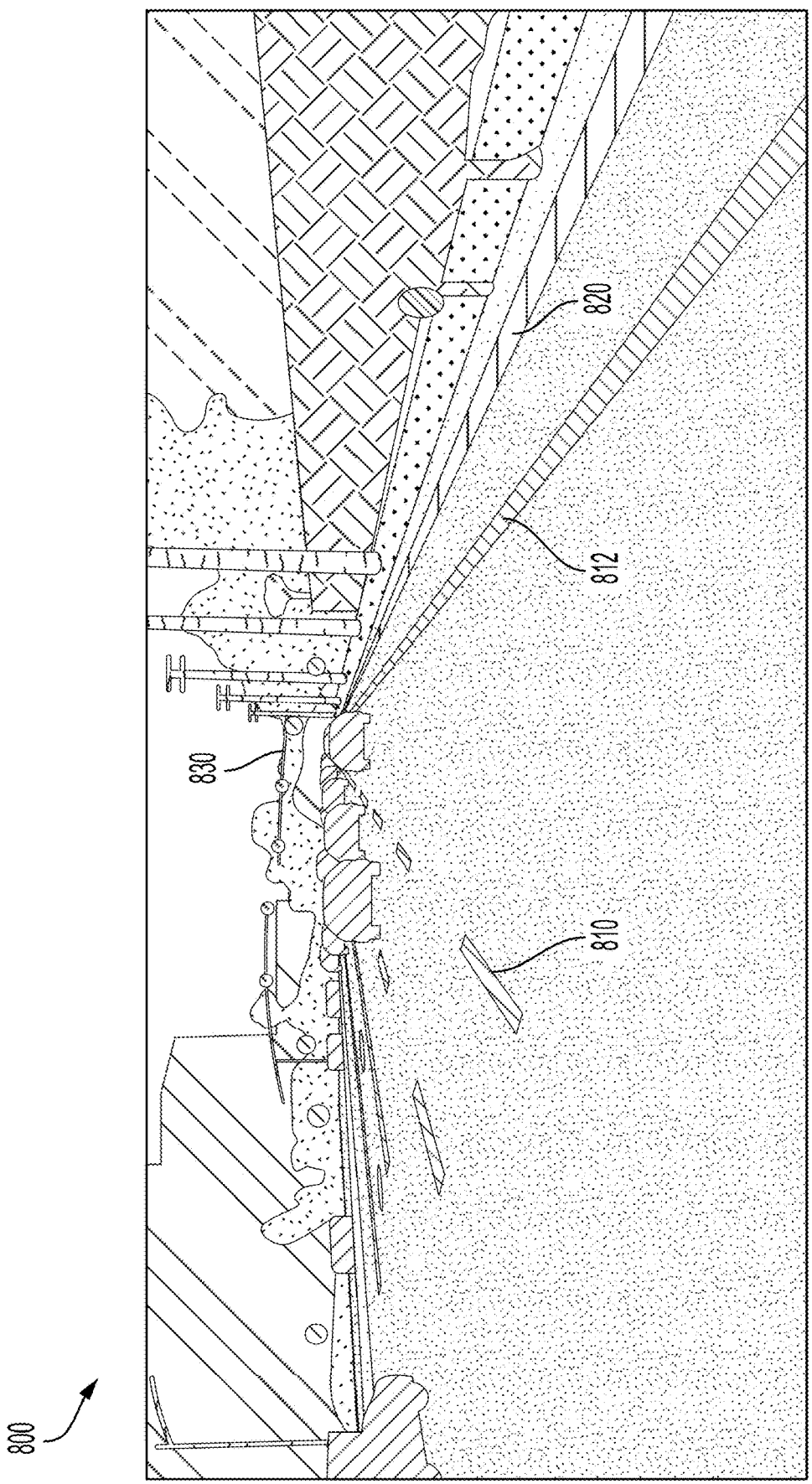
FIG. 8 illustrates a semantic segmentation map generated using feature detection, according to aspects of the present disclosure.

FIG. 8 illustrates a semantic segmentation map 800 generated using feature detection, according to aspects of the present disclosure. In this example, lane markings 810, 812, curbs 820, and traffic signs 830 are detected from images. In this configuration, detecting of the lane markings 810, 812, the curbs 820, and/or the traffic signs 830 may be based on semantic segmentation networks or any of the traditional algorithms. In one configuration, the semantic segmentation map 800 is generated by the feature detector 512 of FIG. 5. The learning-based online mapping system 500 of FIG. 5 employs the deep neural network (DNN) detector 550 of FIG. 5 that is trained to output the probabilistic map of the surroundings of an ego vehicle, for example, as shown in FIGS. 9A-9D.

Figure 9A:
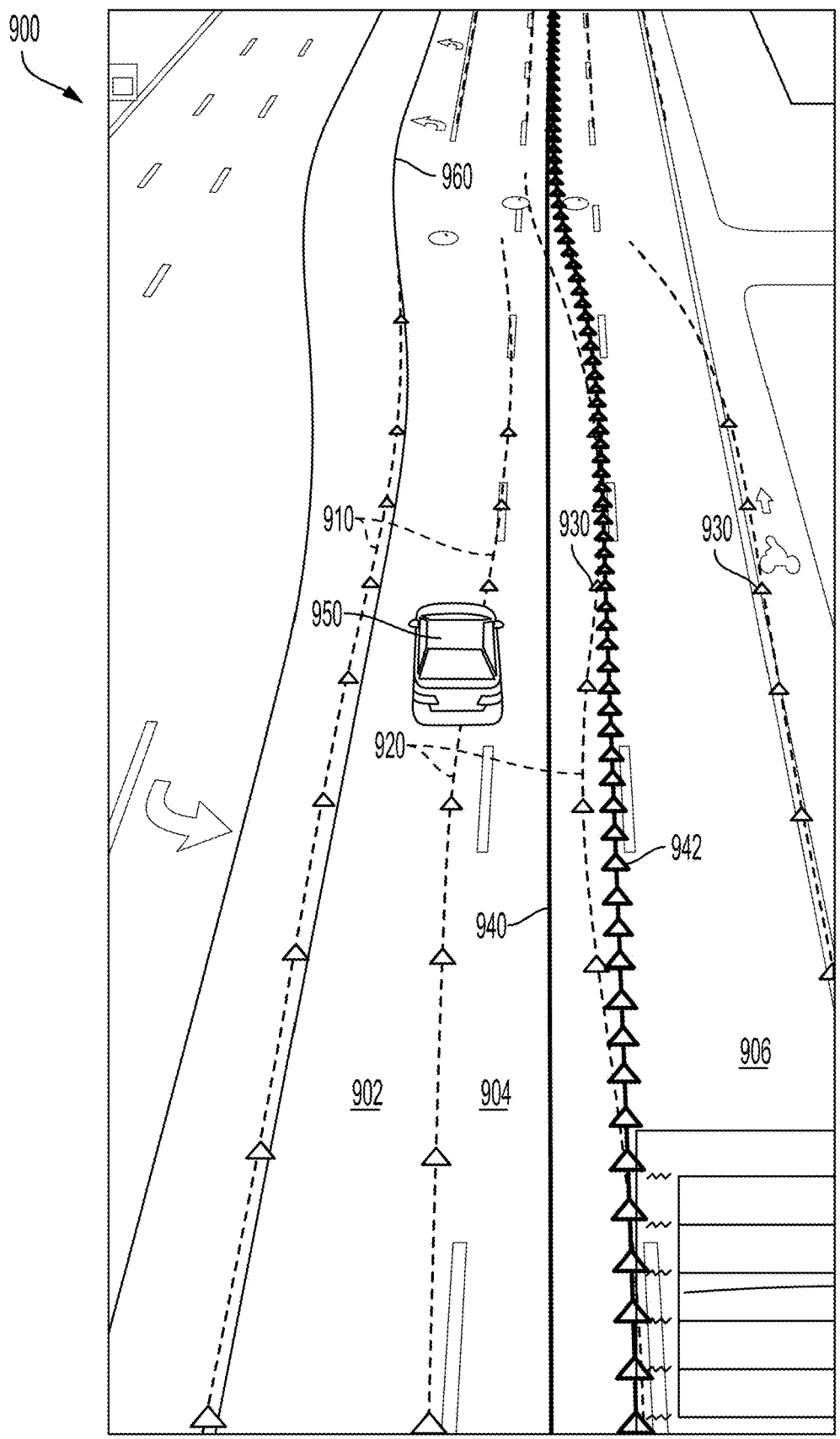
FIGS. 9A-9D are diagrams illustrating components of a probabilistic map, according to aspects of the present disclosure.
Figures 9B, 9C, 9D:
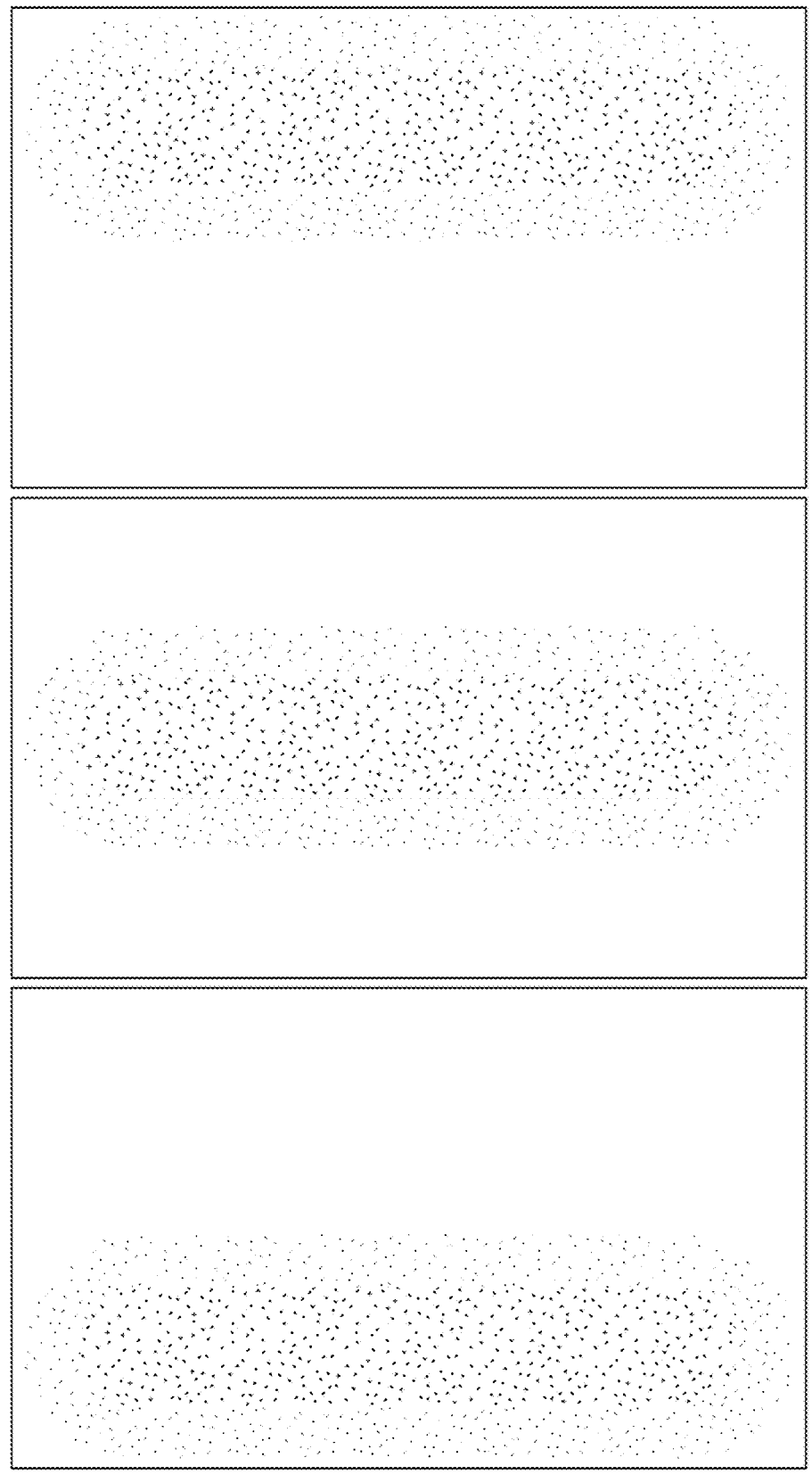

FIGS. 9A-9D are diagrams illustrating components of a probabilistic map according to aspects of the present disclosure. In one configuration, a probabilistic map 900 is the output of the learning-based online mapping system 500. The probabilistic map 900 may include various objects of interest, including, but not limited to, driving lanes, lane lines, intersections, stop lines, crosswalks, and the like. As shown in FIG. 9A, the probabilistic map 900 shows a six-lane highway, having three lanes in each direction, in which an ego vehicle 950 is shown. In this example, the ego vehicle 950 transitions from an ego lane 904 to a left lane 902. A right lane 906 is also shown. In this example, each element in the probabilistic map 900 is represented in a hybrid way. For example, the probabilistic map 900 represents elements using a combination of metric vectors with spatial uncertainty and detection confidence. In addition, a probabilistic grid map 950 of the left lane 902, the ego lane 904, and the right lane 906 are shown in FIGS. 9B-9D.

Taking a lane as an example, a driving lane includes: (1) a left-lane polyline (e.g., a vector of waypoints) of a left-lane line; (2) left-lane spatial uncertainty of the polyline; and (3) a left-lane confidence of the left-lane line estimation. The driving lane also includes: (4) a right-lane polyline (e.g., a vector of waypoints) of a right-lane line; (5) a right-lane spatial uncertainty of the polyline; (6) a right-lane confidence of right-lane line estimation; and (7) a probabilistic grid map of the lane. For example, the left lane 902 is composed of waypoints 910 representing a left-lane line and a right-lane line. Similarly, the ego lane 904 is composed of waypoints 920 representing a left-lane line and a right-lane line of the ego lane 904. In addition, the right lane 906 is composed of waypoints 930 representing a left-lane line and a right-lane line of the right lane 906.

In this example, the probabilistic map 900 identifies a left turn lane 960. Depending on a confidence of the left-lane line estimation and the right-lane line estimation of the waypoints 910, a planner/controller of the ego vehicle 950 selects a trajectory for the ego vehicle 950 to enter the left turn lane 960. According to aspects of the present disclosure, using the probabilistic map 900, a planner/controller of the ego vehicle 950 doesn't necessarily need both of the left-lane line estimation and the right-lane line estimation of the waypoints 910 to have high confidence. Rather, based on the probabilistic grid map of the lane, as long as one of the lane lines exhibits a sufficient level of confidence, the planner/controller can generate a reasonable and safe trajectory to pass through the current road. This is capability is helpful for handling typical situations, such as road lanes with parked vehicles, residential areas, and the like.

Figure 10:
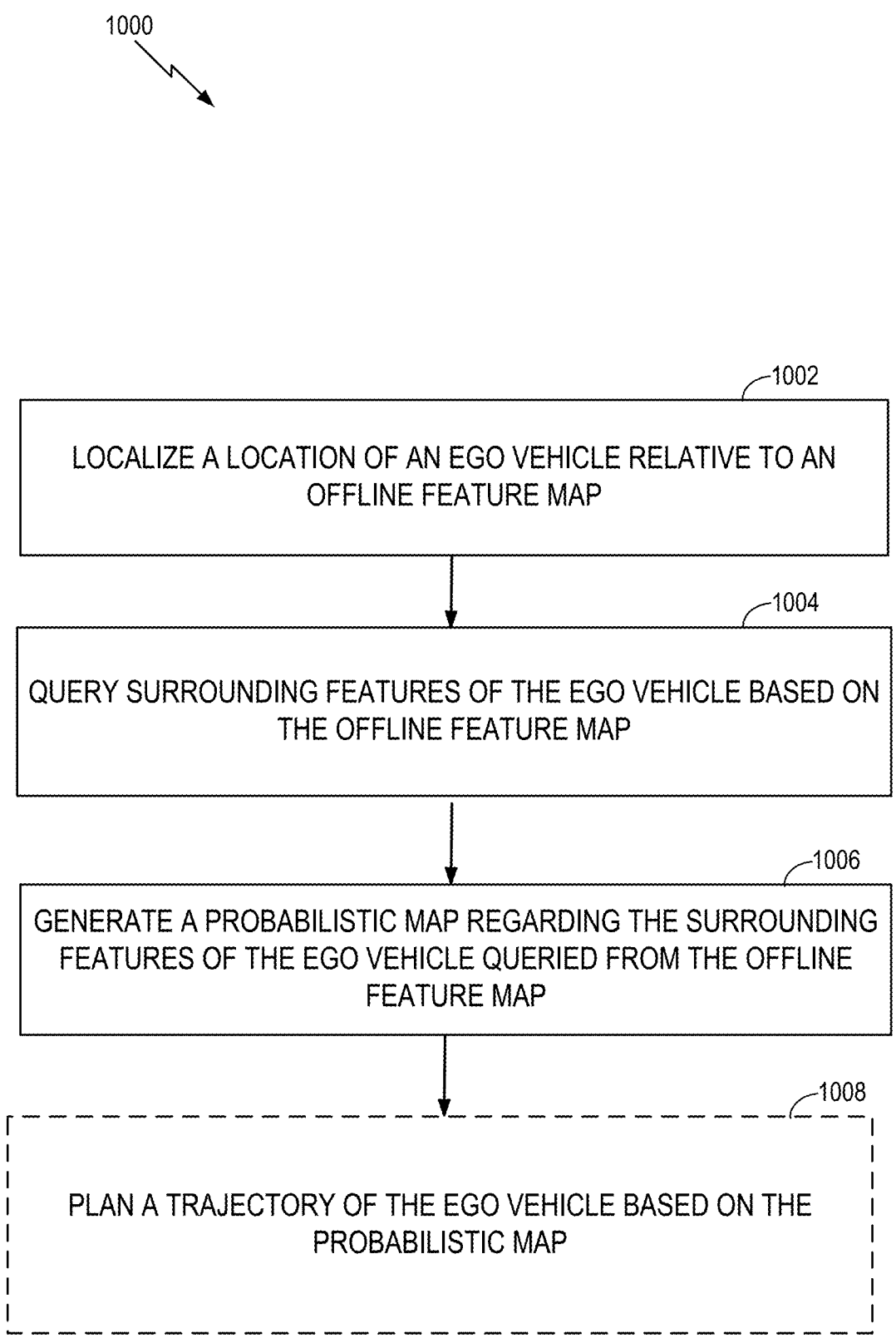
FIG. 10 is a flowchart illustrating a method of three-dimensional (3D) auto-labeling of objects with structural and physical constraints, according to aspects of the present disclosure.

FIG. 10 is a flowchart illustrating a method for learning-based online mapping, according to aspects of the present disclosure. The method 1000 begins at block 1002, in which a location of an ego vehicle is localized relative to an offline feature map. For example, the location of the ego vehicle 650 is determined by localizing detected features such as traffic signs 630 (e.g., a stop sign) with the offline feature map 600, as shown in FIG. 6. In this example, the learning-based online mapping system 500 improves online mapping by using the offline feature map 520, as shown in FIG. 5. By aggregating the updated information within the offline feature map 520, it is possible to infer the transition states of all driving lanes to enable planning and control of the ego vehicle.

At block 1004, surrounding features of the ego vehicle are queried based on the offline feature map. For example, the feature query block 524 enables identification of features of interest to an ego vehicle once the location of the ego vehicle is determined, as shown in FIG. 5. In this example, the localization block 522 of FIG. 5 determines the location of the ego vehicle using a localization process of detected features of the feature detection block. Based on the detection features and the offline feature map 520, the localization process determines the vehicle location relative to the offline feature map 520. This provides rich, discriminative and deterministic information of the surroundings, which are generally not covered from images due to a limited field of view from onboard sensors of an ego vehicle, generating a probabilistic map regarding the surrounding features of the ego vehicle queried from the offline feature map.

At block 1006, a probabilistic map is generated regarding the surrounding features of the ego vehicle queried from the offline feature map. For example, as shown in FIG. 9, the probabilistic map 900 illustrates an ego vehicle 950 on a roadway. The probabilistic map 900 includes various objects of interest, including, but not limited to, driving lanes, lane lines, intersections, stop lines, crosswalks, and the like. For example, each element in the probabilistic map 900 is represented in a hybrid way. In this example, the probabilistic map 900 represents elements using a combination of metric vectors with spatial uncertainty and detection confidence, and a probabilistic grid map.

At optional block 1008, a trajectory of the ego vehicle is planned based on the probabilistic map. For example, as shown in FIG. 3, the planner module 330 is configured to plan a trajectory of an ego vehicle (e.g., car 350), according to the probabilistic map 900, as shown in FIG. 9. In addition, the controller module 340 of FIG. 3 is configured to select vehicle control actions (e.g., acceleration, braking, steering, etc.) based on the probabilistic map 900.

The method 1000 further includes periodically updating the offline feature map by at least one vehicle during operation of the at least one vehicle. The method 1000 also includes generating the probabilistic map by generating objects of interest, including driving lanes, lane lines, intersections, stop lines, and/or crosswalks. The method 1000 further includes storing images captured through front-facing and/or side-facing cameras during normal operation of a fleet of vehicles. The method 1000 also includes detecting features from stored images captured by the fleet of vehicles. The method 1000 further includes updating the offline feature map to form a periodically updated feature map to enable the learning based online mapping of the method 1000. The method 1000 also includes partitioning, using a navigation map, a world map. The method 1000 further includes processing partitioned map information locally while maintaining a global representation of the partitioned map information.

In some aspects of the present disclosure, the method 1000 may be performed by the system-on-a-chip (SOC) 100 (FIG. 1) or the software architecture 200 (FIG. 2) of the ego vehicle 150 (FIG. 1). That is, each of the elements of method 1000 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array (FPGA) signal or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for an online mapping system, comprising:
   localizing a location of an ego vehicle relative to an offline feature map;
   querying surrounding features of the ego vehicle based on the offline feature map to determine updated information including a roadway lane occupied by the ego vehicle;
   generating a probabilistic map regarding the surrounding features of the roadway lane occupied by the ego vehicle queried from the offline feature map;
   aggregating the updated information within the offline feature map and the probabilistic map;
   inferring a lane line estimation of a lane occupied by the ego vehicle and lane line estimations and transition states of roadway lanes surrounding the lane occupied by the ego vehicle; and
   planning and controlling operation of the ego vehicle to pass through the lane line estimation.

2. The method of claim 1, further comprising planning a trajectory of the ego vehicle based on the probabilistic map and the inferred transition states of roadway lanes surrounding the ego vehicle.

3. The method of claim 1, further comprising periodically updating the offline feature map by at least one vehicle during operation of the at least one vehicle.

4. The method of claim 3, in which the at least one vehicle comprises a fleet of autonomous vehicles.

5. The method of claim 1, in which localizing comprises:
   storing images captured through front-facing and/or side-facing cameras during normal operation of a fleet of vehicles;
   detecting features from stored images captured by the fleet of vehicles; and
   updating the offline feature map to form a periodically updated feature map.

6. The method of claim 1, in which localizing comprises:
   detecting features from images captured by the ego vehicle;
   comparing the detected features with features from the offline feature map; and
   determining the location of the ego vehicle based on the comparing.

7. The method of claim 1, in which generating the probabilistic map comprises generating a driving lane.

8. The method of claim 7, in which the driving lane comprises:
   a left-lane polyline, a left-lane spatial uncertainty associated with the left-lane polyline, and a left-lane confidence of the left-lane polyline; and
   a right-lane polyline, a right-lane spatial uncertainty associated with the right-lane polyline, and a right-lane confidence of the right-lane polyline.

9. The method of claim 8, further comprising a probabilistic grid map of the driving lane.

10. The method of claim 1, in which generating the probabilistic map comprises generating objects of interest including driving lanes, lane lines, intersections, stop lines, and/or crosswalks.

11. The method of claim 1, in which localizing comprises:
    partitioning, using a navigation map, a world map; and
    processing partitioned map information locally while maintaining a global representation of the partitioned map information.

12. A non-transitory computer-readable medium having program code recorded thereon for an online mapping system, the program code being executed by a processor and comprising:
    program code to localize a location of an ego vehicle relative to an offline feature map;
    program code to query surrounding features of the ego vehicle based on the offline feature map to determine updated information including a roadway lane occupied by the ego vehicle;
    program code to generate a probabilistic map regarding the surrounding features of the roadway lane occupied by the ego vehicle queried from the offline feature map;
    program code to aggregate the updated information within the offline feature map and the probabilistic map;
    program code to infer a lane line estimation of a lane occupied by the ego vehicle and lane line estimations and transition states of roadway lanes surrounding the lane occupied by the ego vehicle; and
    program code to plan and to control operation of the ego vehicle to pass through the lane line estimation.

13. The non-transitory computer-readable medium of claim 12, in which the program code to localize further comprises:
    program code to store images captured through front-facing and/or side-facing cameras during normal operation of a fleet of vehicles;
    program code to detect features from stored images captured by the fleet of vehicles; and
    program code to update the offline feature map to form a periodically updated feature map.

14. The non-transitory computer-readable medium of claim 12, in which the program code to localize further comprises:
    program code to detect features from images captured by the ego vehicle;
    program code to compare detected features with the features from the offline feature map; and
    program code to determine the location of the ego vehicle based on the comparing.

15. The non-transitory computer-readable medium of claim 12, in which the program code to generate the probabilistic map comprises:
    program code to generate a driving lane, in which the driving lane comprises:
    a left-lane polyline, a left-lane spatial uncertainty associated with the left-lane polyline, and a left-lane confidence of the left-lane polyline;
    a right-lane polyline, a right-lane spatial uncertainty associated with the right-lane polyline, and a right-lane confidence of the right-lane polyline; and
    a probabilistic grid map of the driving lane.

16. The non-transitory computer-readable medium of claim 12, in which the program code to localize comprises:
   program code to partition, using a navigation map, a world map; and
   program code to process partitioned map information locally while maintaining a global representation of the partitioned map information.

17. A system for online mapping, the system comprising:
   a localization module configured to localize a location of an ego vehicle relative to an offline feature map;
   a learned online mapping model trained to query surrounding features of the ego vehicle based on the offline feature map to determine updated information including a roadway lane occupied by the ego vehicle;
   a probabilistic map module configured to generate a probabilistic map regarding the surrounding features of the ego vehicle queried from the offline feature map, and to aggregate the updated information within the offline feature map and the probabilistic map to infer a lane line estimation of a lane occupied by the ego vehicle and lane line estimations and transition states of roadway lanes surrounding the lane occupied by the ego vehicle;
   a planner to plan a trajectory of the ego vehicle based on the probabilistic map and the inferred transition states of roadway lanes surrounding the ego vehicle; and
   a controller to control operation of the ego vehicle to pass through the lane line estimation according to the trajectory.

18. The system of claim 17, in which the localization module is further configured:
   to detect features from images captured by the ego vehicle;
   to compare detected features with the features from the offline feature map; and
   to determine the location of the ego vehicle based on the comparing.

19. The system of claim 17, the probabilistic map module is further configured to generate a driving lane, in which the driving lane comprises:
   a left-lane polyline, a left-lane spatial uncertainty associated with the left-lane polyline, and a left-lane confidence of the left-lane polyline;
   a right-lane polyline, a right-lane spatial uncertainty associated with the right-lane polyline, and a right-lane confidence of the right-lane polyline; and
   a probabilistic grid map of the driving lane.

* * * * *